Aug. 15, 1944.                G. F. RUPP                2,355,604
                       HYDRAULIC POWER TRANSMISSION
                         Filed Aug. 17, 1942        4 Sheets-Sheet 1
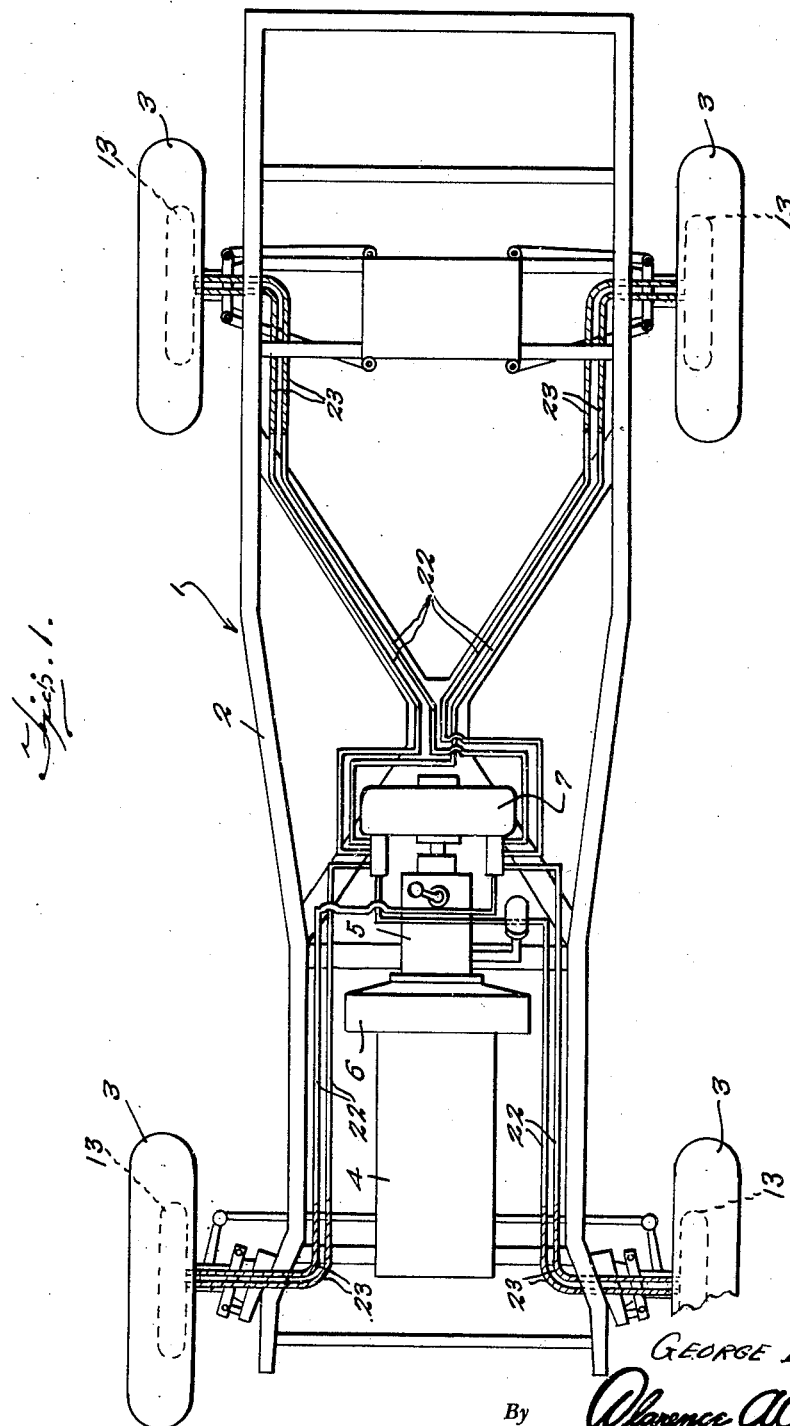
Inventor
GEORGE F. RUPP
By Clarence A. O'Brien
and Harvey B. Jacobson
Attorneys Aug. 15, 1944.  G. F. RUPP  2,355,604
HYDRAULIC POWER TRANSMISSION
Filed Aug. 17, 1942  4 Sheets-Sheet 2
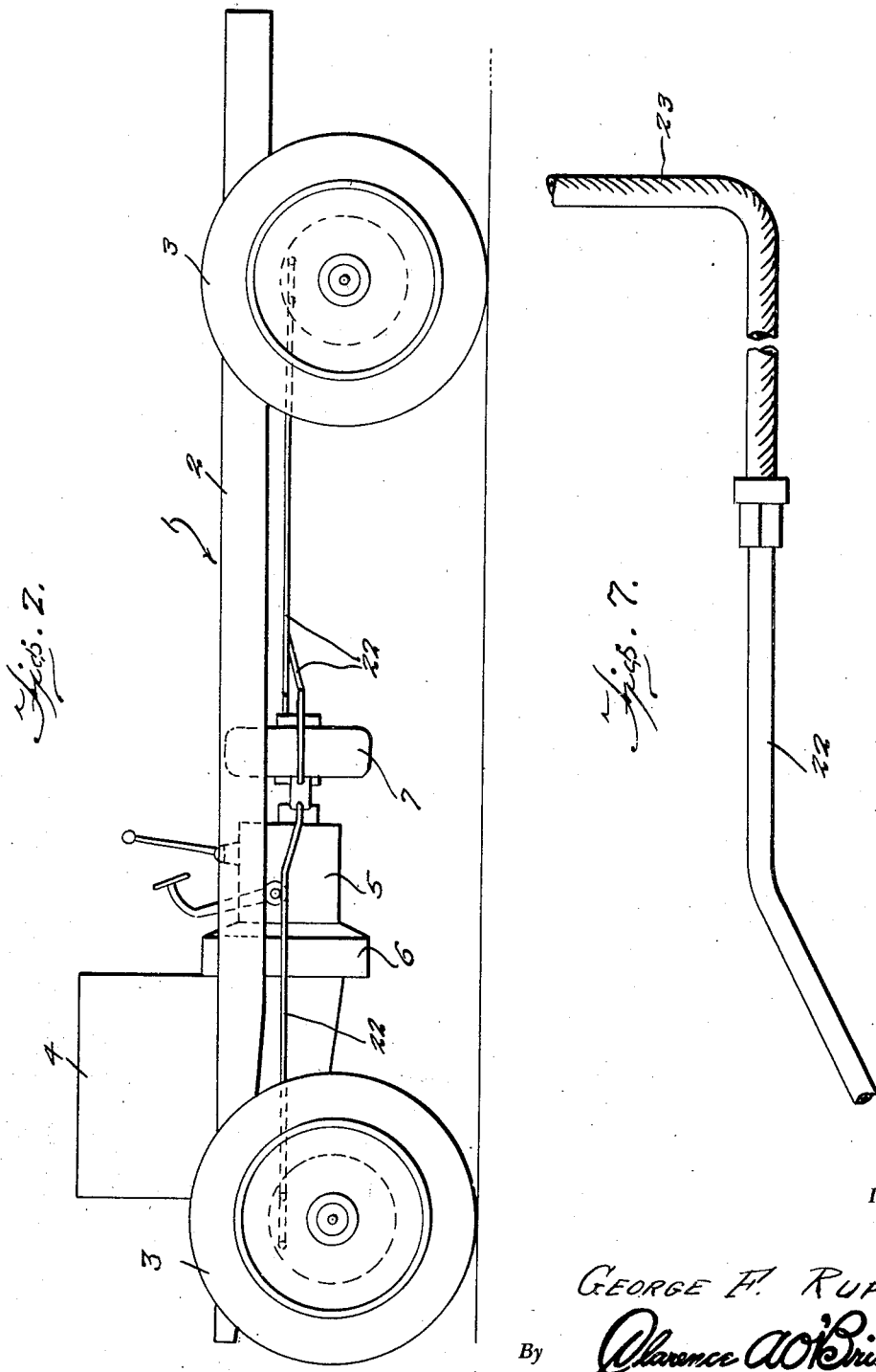
Inventor
GEORGE F. RUPP
By Clarence A. O'Brien
and Harvey B. Jacobson
Attorneys

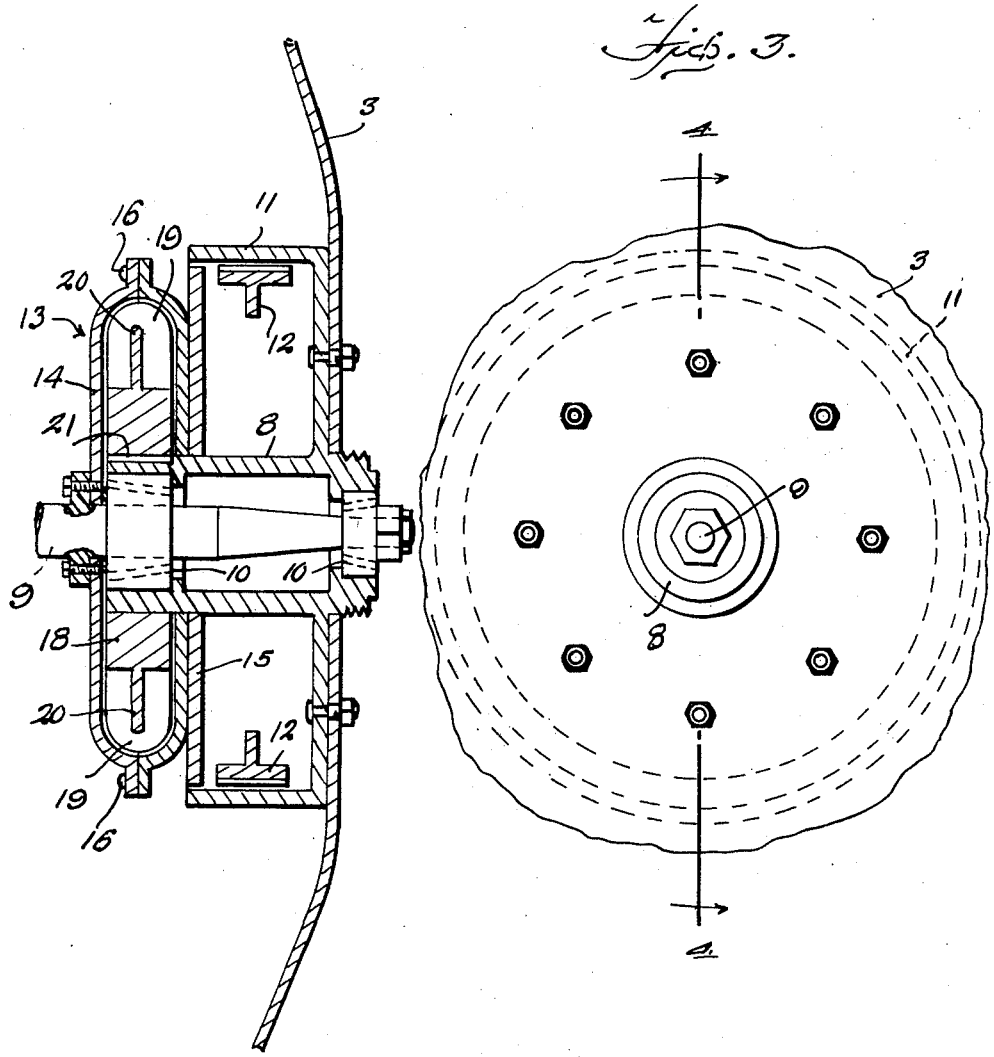

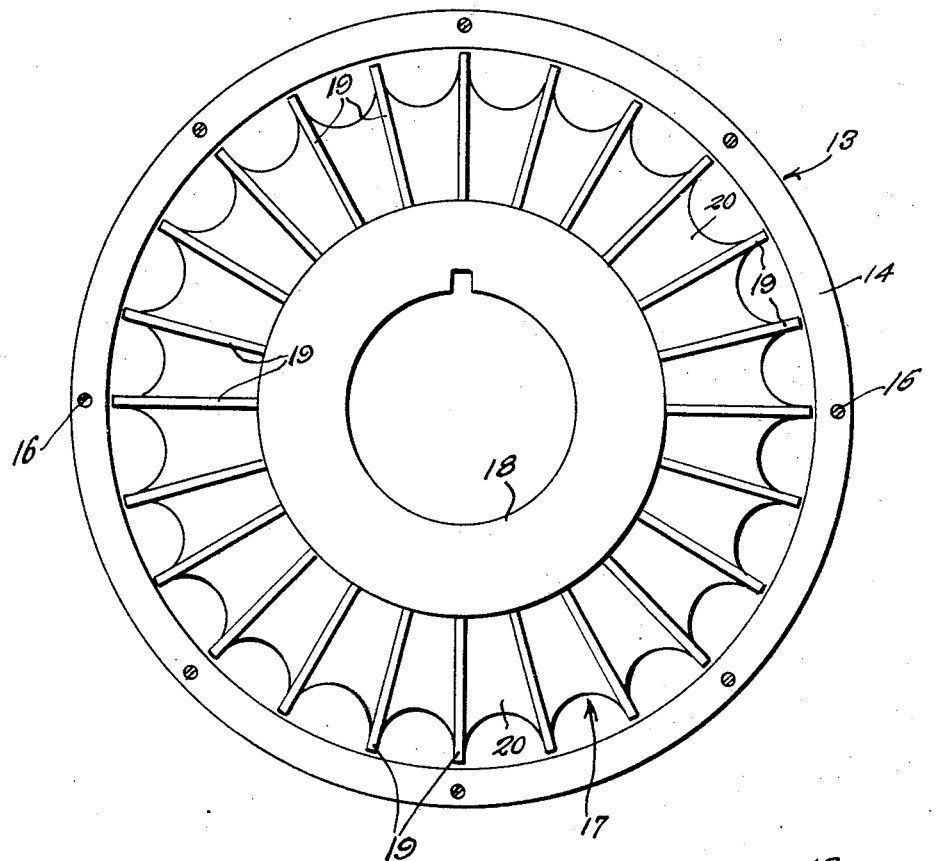
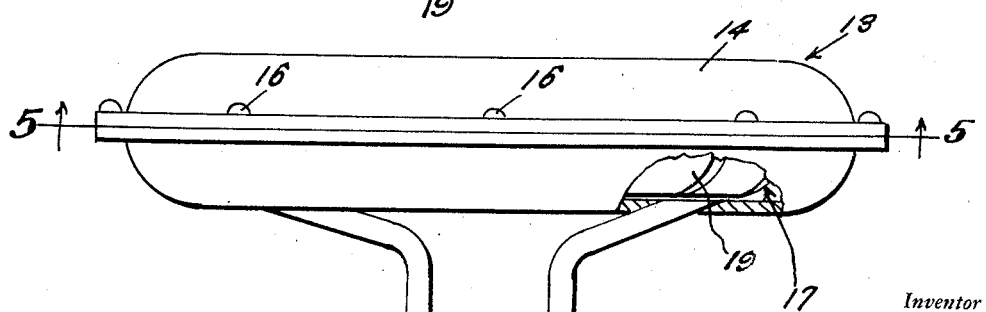
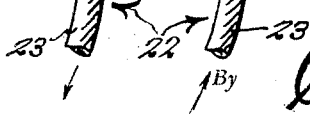

Patented Aug. 15, 1944

2,355,604

UNITED STATES PATENT OFFICE 2,355,604

HYDRAULIC POWER TRANSMISSION

George F. Rupp, Upper Darby, Pa.

Application August 17, 1942, Serial No. 455,153

2 Claims. (Cl. 180—66)

The present invention relates to new and useful improvements in hydraulic power transmissions particularly for motor vehicles although it will be understood, of course, that the apparatus may be used for any other purpose for which it may be found adapted and desirable.

The primary object of the invention is to provide, in a manner as hereinafter set forth, a hydraulic power transmission of the character described comprising a novel construction, combination and arrangement for driving all of the wheels of the vehicle either forwardly or in reverse without the usual differential, drive shaft, etc.

Another very important object of the invention is to provide a hydraulic power transmission of the aforementioned character which will permit the independent springing or mounting of the rear wheels of the vehicle as well as the front wheels thereof.

Still another important object of the invention is to provide a hydraulic power transmission of the character set forth comprising fluid motors or turbines of unique construction for turning the wheels of the vehicle.

Other objects of the invention are to provide a hydraulic power transmission which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a motor vehicle chassis equipped with a hydraulic power transmission constructed in accordance with the present invention.

Figure 2 is a view in side elevation thereof.

Figure 3 is a view in side elevation of the central portion of one of the wheels.

Figure 4 is a vertical sectional view, taken substantially on the line 4—4 of Figure 3.

Figure 5 is a vertical sectional view through one of the turbines, taken substantially on the line 5—5 of Figure 6.

Figure 6 is a top plan view of one of the turbines with a portion thereof broken away in section.

Figure 7 is a plan view of a portion of one of the fluid conduits.

Referring now to the drawings in detail, it will be seen that reference character 1 designates generally a motor vehicle chassis comprising a frame 2 mounted on wheels 3. Mounted in the frame 2 is an engine 4. The engine 4 drives a change speed transmission 5 through a clutch 6. Operatively connected to the transmission 5 is a suitable reversible pump 7.

As illustrated to advantage in Figure 4 of the drawings, hubs 8 are removably mounted on the axles 9 of the vehicle. Suitable bearings 10 are provided for the hubs 8. Mounted on the hubs 8 are brake drums 11 which carry the wheels 3. Brake shoes in the drums 11 are indicated at 12.

Turbines 13 are provided for driving each of the wheels 3. The turbines 13 include stationary housings 14 on which the brake back plates 15 are fixed, said housings comprising opposed, complemental half sections which are detachably secured together at 16.

The turbines 13 further include rotors 17 which are operable in the stationary housings 14. The rotors 17 comprise rings 18 from which fins or blades 19 radiate. Reinforcing webs or braces 20 extend between the fins or blades 19. The rings 18 are keyed or splined, as at 21, to the hubs 8 in a manner to permit removal of the latter.

Conduits 22 have one end connected to opposite sides of the reversible pump 7. One of the conduits 22 from each side of the pump 7 is connected to each of the turbines 13. As best seen in Figure 6 of the drawings, these pairs of conduits 22 are connected to the housings 14 in a manner to drive the turbines 17 in either direction. The conduits 22 include flexible sections or portions 23 which permit movement of the wheels 3 relative to the frame 2.

It is thought that the operation of the apparatus will be readily apparent from a consideration of the foregoing. Of course, the system is to be substantially filled with a suitable fluid. With the transmission 5 in neutral, the pump 7 is disconnected from the engine 4. Of course, this may also be accomplished by disengaging the clutch 6. With the transmission 5 in any of its forward speeds and the clutch 6 engaged, the pump 7 is driven in one direction for forcing the fluid through one of each of the pairs of conduits 22 for driving the rotors 17 in a direction to propel the wheels 3 forwardly. Of course, this fluid returns to the pump 7 through the other of each of the pairs of conduits 22. When it is desired to back the vehicle the transmission 5 is put in reverse for reversing the pump 7, thereby causing the fluid to travel in the opposite direction through the conduits 22 and the turbines 13.

It is believed that the many advantages of a hydraulic power transmission constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

Having described the invention, what is claimed as new is:

1. A fluid-driven wheel comprising a hub for the wheel and adapted for free rotation on a stationary axle, a housing secured to the axle and having the inner end of the hub journaled therein, a rotor in the housing keyed on the inner end of the hub, said rotor having turbine blades thereon, and means for supplying fluid pressure to the blades.

2. A fluid-driven wheel comprising a hub for the wheel and adapted for free rotation on a stationary axle, a stationary housing on the inner end of the hub, a rotor in the housing keyed on the inner end of the hub, said rotor having turbine blades thereon, and means for supplying fluid pressure to the blades.

GEORGE F. RUPP.